US012603048B2

(12) United States Patent
Baek et al.

(10) Patent No.: US 12,603,048 B2
(45) Date of Patent: Apr. 14, 2026

(54) ORGANIC LIGHT EMITTING DIODE (OLED) DISPLAY DEVICE REDUCING FLICKER BY REFLECTING DISTANCE BETWEEN DISPLAY DEVICE AND THE USER

(71) Applicant: LG Display Co., Ltd., Seoul (KR)

(72) Inventors: Sanghun Baek, Paju-si (KR); Minki Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/921,717

(22) Filed: Oct. 21, 2024

(65) Prior Publication Data

US 2025/0148982 A1 May 8, 2025

(30) Foreign Application Priority Data

Nov. 6, 2023 (KR) ........................ 10-2023-0151968

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0247* (2013.01); *G09G 2330/021* (2013.01); *G09G 2354/00* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 2330/021
USPC ...................................................... 345/76–83
See application file for complete search history.

(56) References Cited

U.S. PATENT DOCUMENTS

| | | | | | |
|---|---|---|---|---|---|
| 2015/0124004 | A1* | 5/2015 | Hayashi | G09G 3/3233 | 345/76 |
| 2015/0179150 | A1* | 6/2015 | Andrysco | G09G 5/391 | 345/156 |
| 2015/0248210 | A1* | 9/2015 | Lee | G06F 1/3265 | 345/593 |
| 2016/0035278 | A1* | 2/2016 | Iida | G09G 3/3233 | 345/78 |
| 2016/0253956 | A1* | 9/2016 | Sagawa | H10D 86/60 | 345/76 |
| 2019/0155364 | A1* | 5/2019 | Chen | G06F 1/3265 | |
| 2020/0133374 | A1* | 4/2020 | Sinha | G06F 3/013 | |
| 2021/0109585 | A1* | 4/2021 | Fleming | G06F 1/3234 | |
| 2021/0327394 | A1* | 10/2021 | Bui | G06F 1/3231 | |

(Continued)

*Primary Examiner* — Ke Xiao
*Assistant Examiner* — Nelson Lam
(74) *Attorney, Agent, or Firm* — Morgan, Lewis & Bockius LLP

(57) ABSTRACT

A display device may include a display panel including a plurality of subpixels, a mode control circuit configured to control a driving mode by determining a state of a user, a compensation control circuit configured to control compensation for at least one of a driving voltage and a data signal according to the user's state, a data driving circuit configured to supply a compensated data signal to the display panel according to control of the compensation control circuit, and a power management circuit configured to supply a compensated driving voltage to the display panel according to control of the compensation control circuit.

14 Claims, 14 Drawing Sheets

(56) References Cited

U.S. PATENT DOCUMENTS

| | | | | |
|---|---|---|---|---|
| 2022/0147142 A1* | 5/2022 | Bui | G09G 3/2092 | |
| 2023/0154375 A1* | 5/2023 | Lin | G09G 3/20 | |
| 2023/0169928 A1* | 6/2023 | Eun | G09G 3/3233 | 345/204 |
| 2023/0196998 A1* | 6/2023 | Han | G09G 3/3208 | 345/212 |

* cited by examiner

ORGANIC LIGHT EMITTING DIODE (OLED) DISPLAY DEVICE REDUCING FLICKER BY REFLECTING DISTANCE BETWEEN DISPLAY DEVICE AND THE USER

CROSS-REFERENCE TO RELATED APPLICATION

This application claims priority from Korean Patent Application No. 10-2023-0151968, filed on Nov. 6, 2023, which is hereby incorporated by reference for all purposes as if fully set forth herein.

BACKGROUND

Field

Embodiments of the present disclosure relate to a display device, a driving circuit, and a display driving method and, more specifically, to a display device, a driving circuit, and a display driving method which may reduce image quality defects, such as flicker, occurring while the driving frequency is changed.

Description of Related Art

With the development of the information society, various needs for display devices that display images are increasing, and various types of display devices, such as liquid crystal displays LCDs, organic light emitting displays OLEDs, etc. are being utilized.

Among these display devices, the organic light emitting display device uses self-emissive organic light emitting diodes, providing advantages, such as a fast response and better contrast ratio, luminous efficiency, luminance, and viewing angle.

The organic light emitting diode display include organic light emitting diodes in subpixels arranged on the display panel and emits the organic light emitting diodes by controlling the current flowing to the organic light emitting diodes, thereby controlling the brightness represented by each subpixel while displaying an image.

The image data supplied to the display device may be a still image or a video that is variable at a constant speed, such as a sports video, movie, or game video. Further, the display device may switch to various driving modes depending on the user's input or operating state.

In this case, the display device may change the driving frequency depending on the type of input image data or driving mode, but in this process, an image quality defect, such as flicker, may occur due to the change in driving voltage.

SUMMARY

Accordingly, the present disclosure is directed to a display device, a driving circuit, and a display driving method that substantially obviate one or more of the problems due to limitations and disadvantages of the related art.

For example, the inventors of the present disclosure have invented a display device, a driving circuit, and a display driving method which may reduce image quality defects that may occur while the driving frequency changes.

Embodiments of the present disclosure may provide a display device, a driving circuit, and a display driving method which may reduce image quality defects, such as flicker, by controlling the driving frequency by reflecting the distance between the display device and the user and the user's non-use time.

Embodiments of the present disclosure may provide a display device, a driving circuit, and a display driving method which may reduce image quality defects by controlling the level of the driving voltage according to the driving frequency.

The objects of the present disclosure are not limited to the above-described objects, and other objects not mentioned can be clearly understood by those skilled in the art from the following description.

To achieve these objects and other advantages of the present disclosure, as embodied and broadly described herein, a display device may include a display panel including a plurality of subpixels, a mode control circuit configured to control a driving mode by determining a state of a user, a compensation control circuit configured to control compensation for at least one of a driving voltage and a data signal according to the user's state, a data driving circuit configured to supply a compensated data signal to the display panel according to control of the compensation control circuit, and a power management circuit configured to supply a compensated driving voltage to the display panel according to control of the compensation control circuit.

In another aspect of the present disclosure, a driving circuit may include a mode control circuit configured to determine a state of a user based on at least one of a distance to the user and a non-input time for a display, and to control a driving mode; a compensation control circuit configured to control compensation for a driving voltage or a data signal according to the user's state; a data driving circuit configured to supply a compensated data signal to a display panel under control of the compensation control circuit; and a power management circuit configured to supply a compensated driving voltage to the display panel under control of the compensation control circuit.

In yet another aspect of the present disclosure, a display driving method may include detecting a user's state information, determining a driving mode according to the user's state information, determining a target driving voltage corresponding to the driving mode, generating a data signal corresponding to the target driving voltage, and supplying a compensated driving voltage and the data signal.

According to embodiments of the present disclosure, it is possible to reduce image quality defects that occur while the driving frequency changes.

Further, according to embodiments of the present disclosure, it is possible to reduce image quality defects, such as flicker, by controlling the driving frequency by reflecting the distance between the display device and the user and the user's non-use time.

Further, according to embodiments of the present disclosure, it is possible to reduce power consumption and implement low power by controlling the level of the driving voltage according to the driving frequency.

The advantages and effects according to the present disclosure are not limited to those described above, and additional advantages and effects are included in or may be obtained from the present disclosure.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures as claimed.

BRIEF DESCRIPTION OF DRAWINGS

The accompanying drawings, which are included to provide a further understanding of the disclosure and are incorporated in and constitute a part of this application, illustrate example embodiments of the disclosure and together with the description serve to explain the principles of the disclosure. In the drawings.

DETAILED DESCRIPTION

Figure 1:
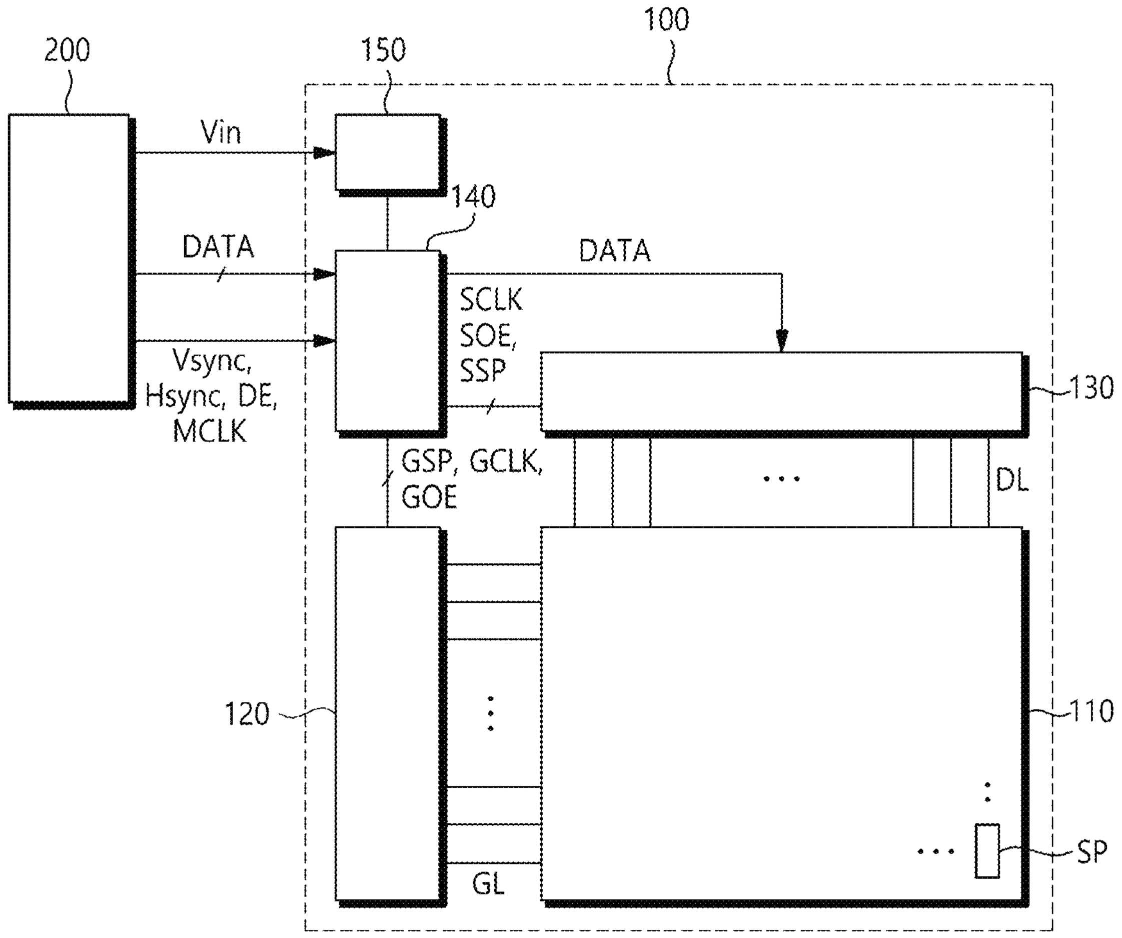
FIG. 1 is a view schematically illustrating a display device according to embodiments of the disclosure.

Hereinafter, various example embodiments of the present disclosure will be described in detail with reference to the accompanying drawings.

In the following description of examples or embodiments of the disclosure, reference will be made to the accompanying drawings in which specific examples or embodiments that can be implemented are shown by way of illustration, and in which the same reference numerals and signs can be used to designate the same or like components even when they are shown in different accompanying drawings from one another. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

In the following description, where a detailed description of a relevant known function or configuration may unnecessarily obscure aspects of the present disclosure, a detailed description of such a known function or configuration may be omitted or be briefly discussed.

Where a term like "include," "have," "contain," "constitute," "make up of," or "formed of" is used, one or more other elements may be added unless the term is used with a more limiting term, such as "only." An element described in a singular form may include a plurality of elements, and vice versa, unless the context clearly indicates otherwise.

Although terms "first," "second," "A," "B," "(A)," "(B)," and the like may be used herein to describe various elements, these elements should not be interpreted to be limited by these terms as they are not used to define a particular essence, order, sequence, precedence, or number of such elements. These terms are used only to refer to one element separately from another. For example, a first element could be termed a second element, and a second element could similarly be termed a first element, without departing from the scope of the present disclosure.

Where a description is provided that a first element "is connected or coupled to," "contacts or overlaps," a second element, or the like, it should be interpreted that, not only can the first element "be directly connected or coupled to" or "directly contact or overlap" the second element, but a third element can also be "interposed" between the first and second elements, or the first and second elements can "be connected or coupled to" or "contact or overlap" each other via a fourth element. Here, the second element may be included in at least one of two or more elements that "are connected or coupled to" or "contact or overlap" each other.

Where time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the terms are used with a more limiting term like "directly" or "immediately."

In addition, where any dimensions, relative sizes, and the like are described, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the present disclosure will be described in detail with reference to the accompanying drawings.

FIG. 1 is a view schematically illustrating a display device according to embodiments of the disclosure;

As shown in FIG. 1, a display device 100 according to an embodiment of the disclosure may include a display panel 110 where a plurality of gate lines GL and data lines DL are connected, and a plurality of subpixels SP are arranged in a matrix form, a gate driving circuit 120 driving the plurality of gate lines GL, a data driving circuit 130 supplying a data voltage through the plurality of data lines DL, a timing controller 140 controlling the gate driving circuit 120 and the data driving circuit 130, and a power management circuit 150.

The display panel 110 displays an image based on a gate signal transferred from the gate driving circuit 120 through the plurality of gate line GLs GL and the data voltage transferred from the data driving circuit 130 through the plurality of data lines DL.

In the case of a liquid crystal display, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display, the display panel 110 may be implemented in a top emission scheme, a bottom emission scheme, or a dual-emission scheme.

In the display panel 110, a plurality of pixels may be arranged in a matrix form, and each pixel may include subpixels SP having different colors, e.g., a white subpixel, a red subpixel, a green subpixel, and a blue subpixel, and each subpixel SP may be defined by the plurality of data lines DL and the plurality of gate lines GL.

One subpixel SP may include, e.g., a thin film transistor (TFT) formed at the intersection between one data line DL and one gate line GL, a light emitting element, such as an organic light emitting diode, charged with the data voltage, and a storage capacitor electrically connected to the light emitting element to maintain the voltage.

For example, when the display device 100 having a resolution of 2,160×3,840 includes four subpixels SP of white (W), red (R), green (G), and blue (B), 3,840 data lines DL may be connected to 2,160 gate lines GL and four subpixels WRGB, and thus, there may be provided 3,840×4=15,360 data lines DL. Each subpixel SP is disposed at the intersection between the gate line GL and the data line DL.

The gate driving circuit 120 may be controlled by the controller 140 to sequentially output gate signals to the plurality of gate lines GL disposed in the display panel 110, controlling the driving timing of the plurality of subpixels SP.

In some cases, the gate driving circuit 120 may output a scan signal for controlling the driving timing of the subpixel SP and a light emission signal for controlling the light emission timing of the subpixel SP. In this case, the gate signal output from the gate driving circuit 120 may include the scan signal and the light emission signal. A circuit for outputting scan signals and a circuit for outputting light emission signals may be implemented as a single circuit or separate circuits.

In the display device 100 having a resolution of 2,160×3,840, sequentially outputting the scan signal to the 2,160 gate lines GL from the first gate line to the 2,160th gate line may be referred to as 2,160-phase driving. Sequentially outputting the scan signal to each unit of four gate lines GL, e.g., sequentially outputting the scan signal to the fifth gate line to the eighth gate line after sequentially outputting the scan signal to the first gate line to the fourth gate line, is referred to as 4-phase driving. In other words, sequentially outputting the scan signal to every N gate lines GL may be referred to as N-phase driving.

The gate driving circuit 120 may include one or more gate driving integrated circuits (GDICs). Depending on driving schemes, the gate driving circuit 120 may be positioned on only one side, or each of two opposite sides, of the display panel 110. The gate driving circuit 120 may be implemented in a gate-in-panel (GIP) form which is embedded in the bezel area of the display panel 110.

The data driving circuit 130 receives image data DATA from the timing controller 140 and converts the received image data DATA into an analog data voltage. Then, as the data voltage is output to each data line DL according to the timing when the scan signal is applied through the gate line GL, each subpixel SP connected to the data line DL displays a light emission signal having the brightness corresponding to the data voltage.

Likewise, the data driving circuit 130 may include one or more source driving integrated circuits SDIC, and the source driving integrated circuit SDIC may be connected to the bonding pad of the display panel 110 in a tape automated bonding (TAB) type or a chip-on-glass (COG) type or may be disposed directly on the display panel 110.

In some cases, each source driving integrated circuit SDIC may be integrated and disposed on the display panel 110. Further, each source driving integrated circuit SDIC may be implemented in a chip-on-film (COF) type and, in this case, each source driving integrated circuit SDIC may be mounted on a circuit film and may be electrically connected to the data line DL of the display panel 110 through the circuit film.

The timing controller 140 supplies various control signals to the gate driving circuit 120 and the data driving circuit 130 and controls the operation of the gate driving circuit 120 and the data driving circuit 130. In other words, the timing controller 140 may control the gate driving circuit 120 to output a scan signal according to the timing implemented in each frame and, on the other hand, transfers the image data DATA received from the outside to the data driving circuit 130.

In this case, the timing controller 140 receives, from an external host system 200, several timing signals including, e.g., a vertical synchronization signal Vsync, a horizontal synchronization signal Hsync, a data enable signal DE, and a main clock MCLK, together with the image data DATA.

The host system 200 may be any one of a television (TV) system, a set-top box, a navigation system, a personal computer (PC), a home theater system, a mobile device, and a wearable device.

Accordingly, the timing controller 140 may generate a control signal according to various timing signals received from the host system 200 and transfers the control signal to the gate driving circuit 120 and the data driving circuit 130.

For example, the timing controller 140 outputs several gate control signals including, e.g., a gate start pulse GSP, a gate clock GCLK, and a gate output enable signal GOE, to control the gate driving circuit 120. The gate start pulse GSP controls the timing at which one or more gate driving integrated circuits GDIC constituting the gate driving circuit 120 start operation. The gate clock GCLK is a clock signal commonly input to one or more gate driving integrated circuits GDIC and controls the shift timing of the scan signal. The gate output enable signal GOE designates timing information about one or more gate driving integrated circuits GDICs.

The timing controller 140 outputs various data control signals including, e.g., a source start pulse SSP, a source sampling clock SCLK, and a source output enable signal SOE, to control the data driving circuit 130. The source start pulse SSP controls the timing at which one or more source driving integrated circuits SDIC constituting the data driving circuit 130 start data sampling. The source sampling clock SCLK is a clock signal that controls the timing of sampling data in the source driving integrated circuit SDIC. The source output enable signal SOE controls the output timing of the data driving circuit 130.

The display device 100 may further include a power management circuit 150 that supplies various voltages or currents to, e.g., the display panel 110, the gate driving circuit 120, and the data driving circuit 130 or controls various voltages or currents to be supplied.

The power management circuit 150 adjusts the direct current (DC) input voltage Vin supplied from the host system 200, generating power required to drive the display panel 100, the gate driving circuit 120, and the data driving circuit 130.

The subpixel SP is positioned at the intersection between the gate line GL and the data line DL, and a light emitting element may be disposed in each subpixel SP. For example, the organic light emitting diode display may include a light emitting element, such as an organic light emitting diode, in each subpixel SP and may display an image by controlling the current flowing to the light emitting element according to the data voltage.

The display device 100 may be one of various types of devices, such as liquid crystal displays, organic light emitting diode displays, or plasma display panels.

Figure 2:
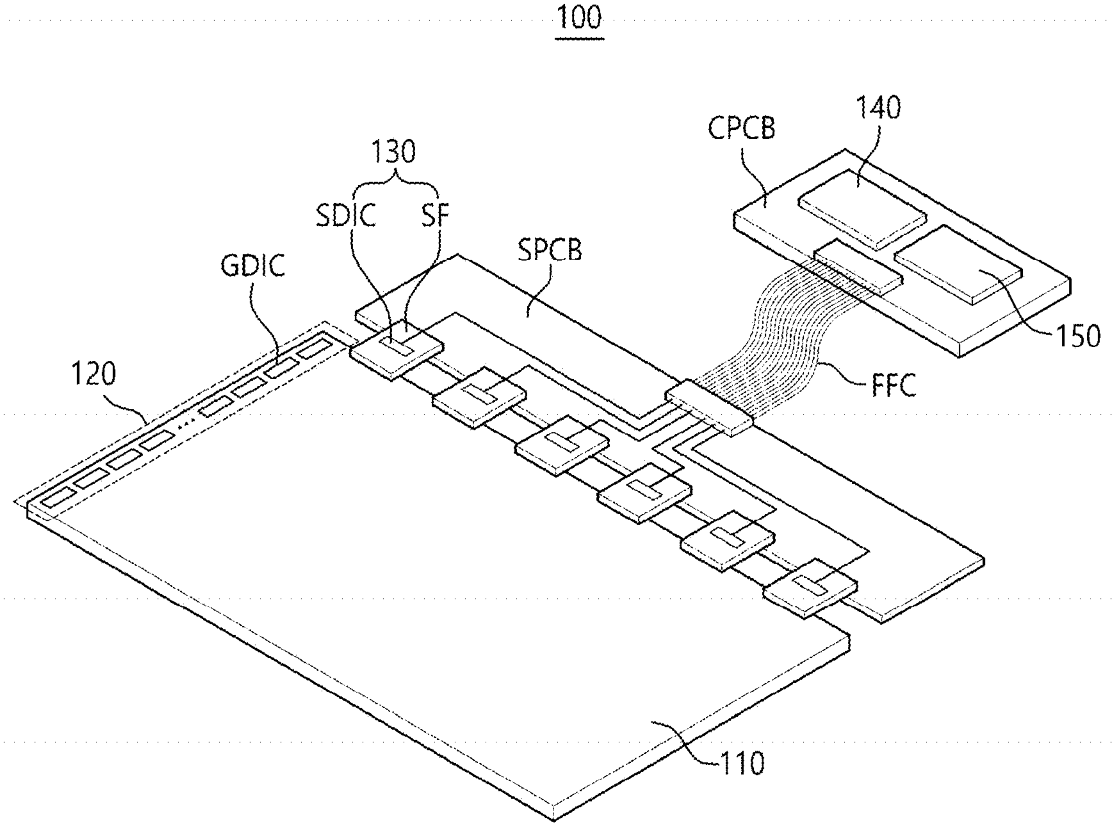
FIG. 2 is a view illustrating an example of a connection structure of a display panel in a display device according to embodiments of the disclosure.

FIG. 2 is a view illustrating an example of a connection structure of a display panel in a display device according to embodiments of the disclosure.

As shown in FIG. 2, a display device 100 according to embodiments of the disclosure may include a gate driving circuit 120 supplying a scan signal to a display panel 110, a data driving circuit 130 supplying a data voltage to the display panel 110, a timing controller 140 controlling the gate driving circuit 120 and the data driving circuit 130, and a power management circuit 150 supplying a driving voltage.

It is herein illustrated that the source driving integrated circuit SDIC constituting the data driving circuit 130 is implemented in a chip-on-film (COF) type among various types (e.g., TAB, COG, or COF), and the gate driving integrated circuit GDIC constituting the gate driving circuit 120 is implemented in a gate-in-panel (GIP) type among various types (e.g., TAB, COG, COF, or GIP).

When the gate driving circuit 120 is implemented in the GIP type, the plurality of gate driving integrated circuits GDIC included in the gate driving circuit 120 may be directly formed in the bezel area of the display panel 110. In this case, the gate driving integrated circuits GDIC may receive various signals (e.g., a clock signal, a gate high signal, a gate low signal, etc.) necessary for generating scan signals through gate driving-related signal lines disposed in the bezel area.

Likewise, one or more source driving integrated circuits SDIC included in the data driving circuit 130 each may be mounted on the source film SF, and one side of the source film SF may be electrically connected with the display panel 110. Lines for electrically connecting the source driver integrated circuit SDIC and the display panel 110 may be disposed on the source film SF.

The display device 100 may include at least one source printed circuit board SPCB for circuit connection between a plurality of source driving integrated circuits SDIC and other devices and a control printed circuit board CPCB for mounting control components and various electric devices.

The other side of the source film SF where the source driving integrated circuit SDIC is mounted may be connected to at least one source printed circuit board SPCB. In other words, one side of the source film SF where the source driving integrated circuit SDIC is mounted may be electrically connected with the display panel 110, and the other side thereof may be electrically connected with the source printed circuit board SPCB.

The timing controller 140 and the power management circuit 150 may be mounted on the control printed circuit board CPCB. The timing controller 140 may control the operation of the data driving circuit 130 and the gate driving circuit 120. The power management circuit 150 may supply driving voltage or current to the display panel 110, the data driving circuit 130, and the gate driving circuit 120 and control the supplied voltage or current.

At least one source printed circuit board SPCB and control printed circuit board CPCB may be circuit-connected through at least one connection member. The connection member may include, e.g., a flexible printed circuit FPC or a flexible flat cable FFC. The at least one source printed circuit board SPCB and control printed circuit board CPCB may be integrated into a single printed circuit board.

The power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 may include a light emitting element and a circuit element, e.g., a driving transistor, for driving the organic light emitting diode.

The type and number of circuit elements constituting each subpixel SP may be varied depending on functions to be provided and design schemes.

Figure 3:
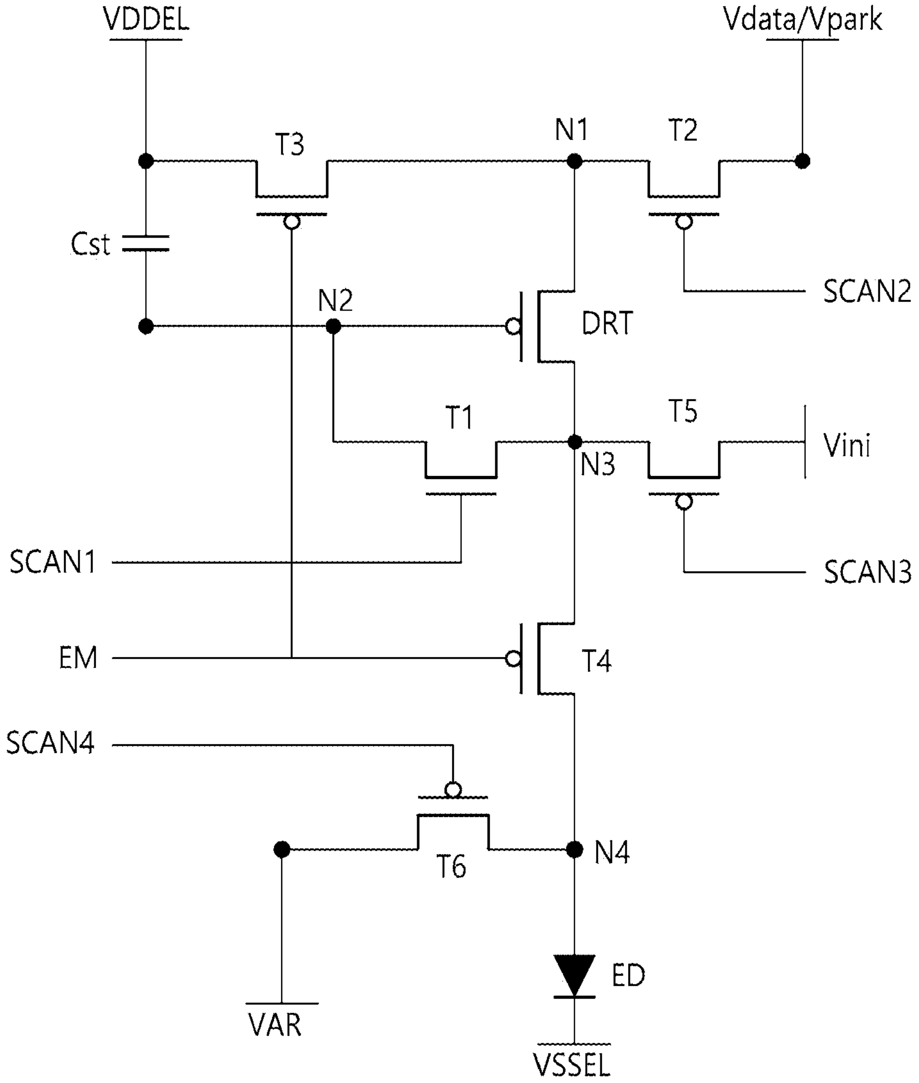
FIG. 3 is a view illustrating an example of a subpixel circuit of a display device according to embodiments of the disclosure.

FIG. 3 is a view illustrating an example of a subpixel circuit of a display device according to embodiments of the disclosure.

As shown in FIG. 3, the subpixel SP of the display device 100 according to embodiments of the disclosure includes first to sixth switching transistors T1 to T6, a driving transistor DRT, a storage capacitor Cst, and a light emitting element ED.

Here, the description is made assuming that an nth subpixel SP in which a light emitting element ED emits light by an nth light emission signal EM.

In this case, the light emitting element ED may be, e.g., a self-emissive light emitting element, such as an organic light emitting diode OLED.

In the subpixel SP according to embodiments of the disclosure, the second to sixth switching transistors T2-T6 and the driving transistor DRT may be P-type transistors. Further, the first switching transistor T1 may be an N-type transistor.

The P-type transistor is relatively more reliable than the N-type transistor. In the case of the P-type transistor, since the drain electrode is electrically connected to the high potential driving voltage VDDEL, the current flowing through the light emitting device ED is not shaken by the storage capacitor Cst. Therefore, it is easy to supply current stably.

For example, the fourth switching transistor T4 and the sixth switching transistor T6 may be connected to the anode electrode of the light emitting device ED. In this case, when the switching transistors T4 and T6 connected to the light emitting diode ED operate in the saturation area, a constant current may flow regardless of a change in the current and threshold voltage of the light emitting diode ED, and thus reliability is relatively high.

In the structure of such a subpixel SP, the N-type transistor T1 may be formed of an oxide transistor (e.g., a transistor having channels formed from semiconductor oxides such as indium, gallium, zinc oxide, or IGZO) formed using semiconductor oxides, and the other P-type transistors DRT and T2-T6 may be silicon transistors (e.g., transistors having polysilicon channels formed using a low temperature process referred to as LTPS or low temperature polysilicon) formed from semiconductors such as silicon.

Since the oxide transistor has a relatively lower leakage current than the silicon transistor, when the transistor is implemented using the oxide transistor, it is possible to reduce a defect in image quality such as a flicker by preventing a current from leaking from the gate electrode of the driving transistor DRT.

Meanwhile, the remaining P-type transistors DRT and T2-T6 except for the first switching transistor T1 corresponding to the N-type transistor may be formed of low temperature polysilicon.

The gate electrode of the first switching transistor T1 receives the first scan signal SCAN1. The drain electrode of the first switching transistor T1 is connected to the gate electrode of the driving transistor DRT through the second node N2. The source electrode of the first switching transistor T1 is connected to the source electrode of the driving transistor DRT.

The first switching transistor T1 is turned on by the first scan signal SCAN1 to control the operation of the driving transistor DRT through the high potential driving voltage VDDEL stored in the storage capacitor Cst. The high-potential driving voltage VDDEL may have a value of 2V to 3V.

The first switching transistor T1 may be formed of an N-type MOS transistor to form an oxide transistor. Since the N-type MOS transistor uses electrons, not holes, as carriers, it has higher mobility than the P-type MOS transistor and may thus have a high switching speed.

The gate electrode of the second switching transistor T2 receives the second scan signal SCAN2. The drain electrode of the second switching transistor T2 may receive the data voltage Vdata or park voltage Vpark. The source electrode of the second switching transistor T2 is connected to the drain electrode of the driving transistor DRT through the first node N1.

The second switching transistor T2 is turned on by the second scan signal SCAN2 and supplies the data voltage Vdata or park voltage Vpark to the drain electrode of the driving transistor DRT.

The data voltage Vdata and the park voltage Vpark are voltages that are supplied through the same signal line (data line), and have different times of application.

The gate electrode of the third switching transistor T3 receives a light emission signal EM. The drain electrode of the third switching transistor T3 receives the high-potential driving voltage VDDEL. The source electrode of the third switching transistor T3 is connected to the drain electrode of the driving transistor DRT through the first node N1.

The third switching transistor T3 is turned on by the light emission signal EM to supply the high potential driving voltage VDDEL to the drain electrode of the driving transistor DRT.

The gate electrode of the fourth switching transistor T4 receives a light emission signal EM. The drain electrode of the fourth switching transistor T4 is connected to the source electrode of the driving transistor DRT through the third node N3. The source electrode of the fourth switching transistor T4 is connected to the anode electrode of the light emitting element ED through the fourth node N4.

Accordingly, the fourth switching transistor T4 is turned on simultaneously with the third switching transistor T3 by the light emission signal EM, and supplies a driving current to the anode electrode of the light emitting element ED.

The gate electrode of the fifth switching transistor T5 is supplied with the third scan signal SCAN3.

The drain electrode of the fifth switching transistor T5 is supplied with an initialization voltage Vini. The initialization voltage Vini may be applied to the source electrode of the driving transistor DRT in a low-speed driving mode driven at a low-speed driving frequency, and may initialize the driving transistor DRT.

The initialization voltage Vini may have a value between −6V and −4V.

The source electrode of the fifth switching transistor T5 is connected to the source electrode of the driving transistor DRT through the third node N3. The fifth switching transistor T5 is turned on by the third scan signal SCAN3 to supply the initialization voltage Vini to the source electrode of the driving transistor DRT.

The gate electrode of the sixth switching transistor T6 is supplied with a fourth scan signal SCAN4.

Here, the fourth scan signal SCAN4 may be a third scan signal SCAN3 supplied to the subpixel SP at another position. For example, when the third scan signal SCAN3 is applied to the nth gate line GL, the fourth scan signal SCAN4 may be the third scan signal SCAN3 applied to the n+1th gate line GL. In other words, the fourth scan signal SCAN4 may use the third scan signal SCAN3 in which the gate line GL is different according to the phase in which the display panel 110 is driven.

The drain electrode of the sixth switching transistor T6 is supplied with the reset voltage VAR. The source electrode of the sixth switching transistor T6 is connected to the anode electrode of the light emitting element ED through the fourth node N4.

The sixth switching transistor T6 is turned on by the fourth scan signal SCAN4 to supply the reset voltage VAR to the anode electrode of the light emitting element ED.

The gate electrode of the driving transistor DRT is connected to the drain electrode of the first switching transistor T1. The drain electrode of the driving transistor DRT is connected to the source electrode of the second switching transistor T2. The source electrode of the driving transistor DRT is connected to the source electrode of the first switching transistor T1.

The driving transistor DRT is turned on by a voltage difference between the source electrode and the drain electrode of the first switching transistor T1, and accordingly, the driving current is applied to the light emitting element ED.

A high-potential driving voltage VDDEL is applied to one side of the storage capacitor Cst, and the other side thereof is connected to the gate electrode of the driving transistor DRT. The storage capacitor Cst stores the voltage of the gate electrode of the driving transistor DRT.

The anode electrode of the light emitting element ED is connected to the source electrode of the fourth switching transistor T4 and the source electrode of the sixth switching transistor T6. A low-potential base voltage VSSEL is applied to the cathode electrode of the light emitting element ED.

The light emitting element ED emits light with a predetermined brightness by a driving current flown by the driving transistor DRT.

In this case, the reset voltage VAR is supplied to reset the anode electrode of the light emitting element ED.

When the reset voltage VAR is supplied to the anode electrode of the light emitting element ED in a state in which the fourth switching transistor T4 positioned between the anode electrode of the light emitting element ED and the driving transistor DRT is turned off by the light emission signal EM, the anode electrode of the light emitting element ED may be reset.

The third scan signal SCAN3 for applying the initialization voltage Vini and the fourth scan signal SCAN4 for controlling the supply of the reset voltage VAR to the anode electrode of the light emitting element ED may have different phases so that the driving operation of the driving transistor DRT and the operation of resetting the anode electrode of the light emitting element ED may be performed separately.

In this case, the subpixel SP may be configured to block the driving current of the driving transistor DRT from flowing to the anode electrode of the light emitting element ED and prevent the anode electrode from being influenced by a voltage other than the reset voltage VAR by turning off the fourth switching transistor T4 connecting the source electrode of the driving transistor DRT to the anode electrode of the light emitting element ED when turning on the switching transistor T5 or T6 supplying the initialization voltage Vini and the reset voltage VAR.

As described above, the subpixel SP constituted of seven transistors DRT, T1, T2, T3, T4, T5, and T6 and one capacitor Cst may be referred to as a 7T1C structure.

Here, the 7T1C structure among the subpixel SP circuits of various structures is illustrated as an example, and the structure and number of transistors and capacitors constituting the subpixel SP may be variously changed. Meanwhile, the plurality of subpixels SP may have the same structure, or some of the plurality of subpixels SP may have a different structure.

In this case, the driving mode of the display device 100 according to the disclosure may be changed according to the state of the user. For example, the driving mode may include a normal driving mode operating at a normal driving frequency of 120 Hz and a low-speed driving mode operating at a low-speed driving frequency lower than the normal driving frequency.

When the display device 100 operates in the low-speed driving mode, the display driving period may include a refresh frame in which image data is output and an anode reset frame in which image data is not output.

Figure 4:
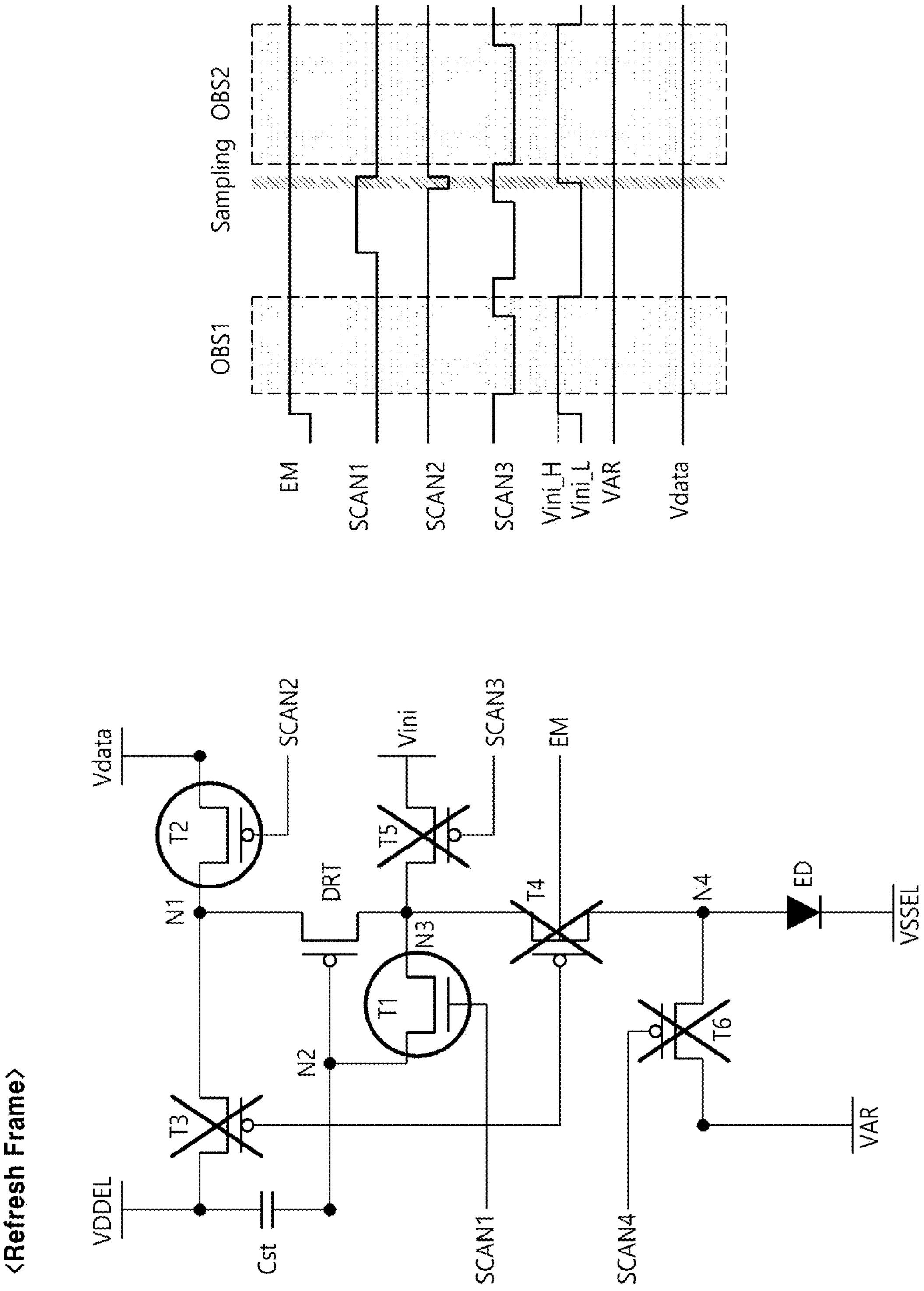
FIG. 4 is a view illustrating a refresh frame in a display device according to embodiments of the disclosure.

FIG. 4 is a view illustrating a refresh frame in a display device according to embodiments of the disclosure.

As shown in FIG. 4, in the display device 100 according to embodiments of the disclosure, the refresh frame may have a first on-bias period OBS1 and a second on-bias period OBS2 configured to apply a high-level initialization voltage Vini_H to the third node N3 of the driving transistor DRT, and a sampling period for applying a voltage corresponding to the data voltage Vdata to the second node N2 of the driving transistor DRT.

The on-bias periods OBS1 and OBS2 may be periods for mitigating hysteresis effects that may occur in the driving transistor DRT and enhancing response characteristics.

During the sampling period, the emission signal EM of the turn-off level voltage is applied to the third transistor T3 and the fourth transistor T4. A first scan signal SCAN1 of a turn-on level voltage is applied to the first transistor T1. A second scan signal SCAN2 of a turn-on level voltage is applied to the second transistor T2. The third scan signal SCAN3 and the fourth scan signal SCAN4 of the turn-off level voltage are applied to the fifth transistor T5 and the sixth transistor T6, respectively.

Before entering the sampling period, the low-level initialization voltage Vini_L is applied to the third node N3 of the driving transistor DRT. In this case, when the first transistor T1 is turned on, the third node N3 and the second node N2 of the driving transistor DRT are electrically connected, and the voltage of the turn-on level is applied to the second node N2 of the driving transistor DRT.

When the second transistor T2 is turned on during the sampling period, the data voltage Vdata is applied to the first node N1 of the driving transistor DRT. In this case, when the driving transistor DRT, the first transistor T1, and the second transistor T2 are turned on, a voltage corresponding to the data voltage Vdata is applied to the second node N2 of the driving transistor DRT. Accordingly, a voltage corresponding to the data voltage Vdata is applied to one end of the storage capacitor Cst.

Figure 5:
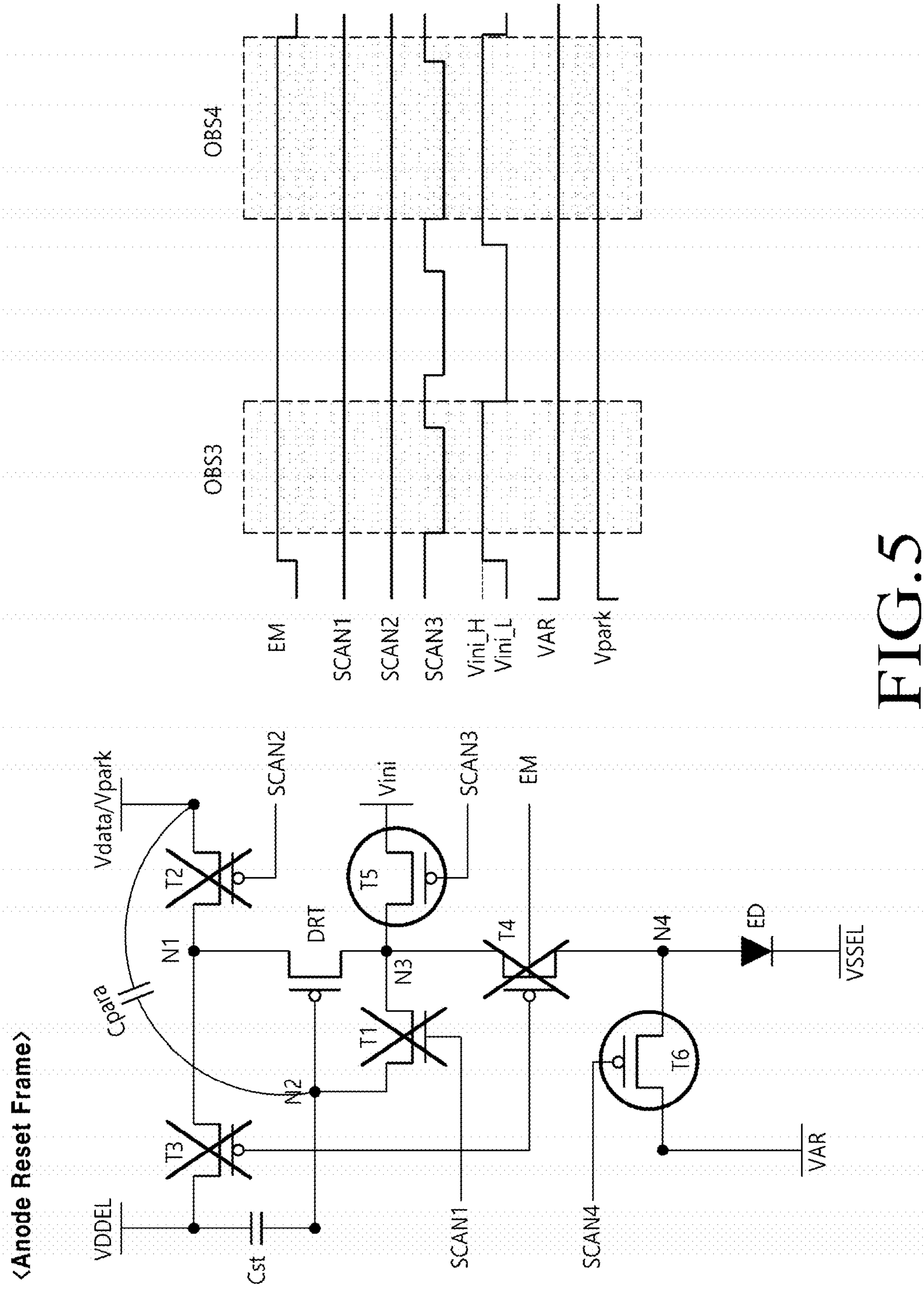
FIG. 5 is a view illustrating an anode reset frame in a display device according to embodiments of the disclosure.

FIG. 5 is a view illustrating an anode reset frame in a display device according to embodiments of the disclosure.

As shown in FIG. 5, in the display device 100 according to embodiments of the disclosure, a turn-off light emission signal EM is applied to the third transistor T3 and the fourth transistor T4. The first scan signal SCAN1 of the turn-off level is applied to the first transistor T1. The second scan signal SCAN2 of the turn-off level is applied to the second transistor T2. A third scan signal SCAN3 and a fourth scan signal SCAN4 are respectively applied to the fifth transistor T5 and the sixth transistor T6. The turn-on level and the turn-off level of the third scan signal SCAN3 and the fourth scan signal SCAN4 may alternate during the anode reset frame.

When the third scan signal SCAN3 is a turn-on level signal, the fifth transistor T5 is turned on. The initialization voltage Vini_H of the high-level voltage is applied to the third node N3 of the driving transistor DRT.

During the anode reset frame period, the initialization voltage Vini_H of the high-level voltage may be applied to the third node N3 of the driving transistor DRT, and the corresponding period may be the third on-bias period OBS3 and the fourth on-bias period OBS4.

When the fourth scan signal SCAN4 is a turn-on level signal, the sixth transistor T6 is turned on. A reset voltage VAR is applied to the anode electrode of the light emitting element ED.

The level of the reset voltage VAR applied to the anode electrode of the light emitting element ED during the anode reset frame may be different from the level of the reset voltage VAR applied to the anode electrode of the light emitting element ED during the refresh frame. When the levels of the voltages applied to the anode electrode of the light emitting element ED during the two periods of the anode reset frame and the refresh frame are different, to distinguish the two voltages, the reset voltage VAR during the refresh frame period may be referred to as a first reset voltage, and the reset voltage VAR during the anode reset frame period may be referred to as a second reset voltage.

This anode reset frame is also referred to as a "skip frame".

Meanwhile, a data voltage Vdata having a preset level is applied to the data line DL during the anode reset frame.

In this case, a parasitic capacitance Cpara may be formed between the second node N2 of the driving transistor DRT and the data line DL applying the data voltage Vdata to the corresponding driving transistor DRT. In some cases, a physical capacitor element having one end electrically connected to the corresponding data line DL and the other end electrically connected to the second node N2 of the driving transistor DRT may be disposed. Hereinafter, an example in which a parasitic capacitance Cpara is formed between the second node N2 of the driving transistor DRT and the data line DL is described.

As the parasitic capacitance Cpara is formed between the second node N2 of the driving transistor DRT and the data line DL during the anode reset frame, the voltage level of the second node N2 of the driving transistor DRT may be prevented from changing by applying a preset level of voltage to the data line DL.

In this case, to prevent the voltage level of the second node N2 of the driving transistor DRT from changing during the anode reset frame period, the data signal applied to the data line DL may be referred to as a "park voltage Vpark". The level of the park voltage Vpark may be identical or similar to the data voltage Vdata for displaying a black grayscale image or a low grayscale image.

Accordingly, the voltage applied to the first node of the driving transistor DRT through the data line DL during the refresh frame period may be referred to as a data voltage Vdata, and the voltage applied to the first node of the driving transistor DRT during the anode reset frame period may be referred to as a park voltage Vpark.

During the anode reset frame, the voltage variation of the second node N2 of the driving transistor DRT is minimized. In other words, the level of the voltage applied to the second node N2 of the driving transistor DRT during the anode reset frame period may be substantially identical or similar to the voltage level in the immediately previous sampling period.

Figure 6:
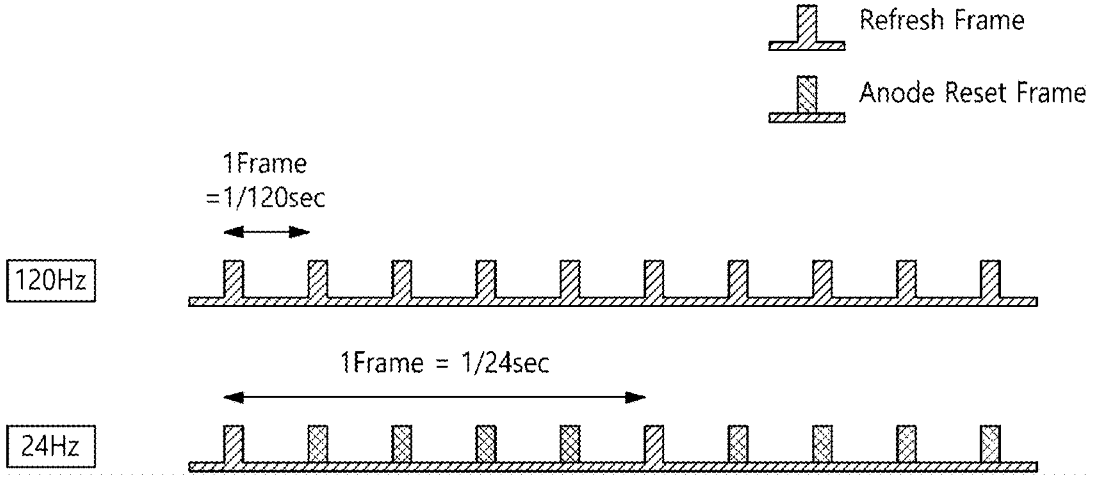
FIG. 6 is a view illustrating a structure of a refresh frame and an anode reset frame according to a driving frequency in a display device according to embodiments of the disclosure.

FIG. 6 is a view illustrating a structure of a refresh frame and an anode reset frame according to a driving frequency in a display device according to embodiments of the disclosure.

As shown in FIG. 6, the display device 100 according to embodiments of the disclosure may perform a high-speed driving operation in which all frames are refresh frames. Further, the display device 100 according to embodiments of the disclosure may perform a low-speed driving operation in which at least one anode reset frame exists between different refresh frames.

In the display device 100 of the disclosure, the driving frequency may be defined as the number of refresh frames output by the display device 100 for one second.

For example, the display device 100 may output 120 refresh frames for one second. In this case, the driving frequency of the corresponding display device 100 is defined as 120 Hz.

On the other hand, the display device 100 may output 24 refresh frames for one second. In this case, the driving frequency of the corresponding display device 100 is defined as 24 Hz.

When the display device 100 is driven at a driving frequency of 120 Hz in the normal driving mode, all of the 120 frames displayed in the display area for one second are refresh frames.

On the other hand, when the display device is driven at a driving frequency of 24 Hz in the low-speed driving mode, 24 of the 120 frames displayed for one second are refresh frames, and the remaining 96 frames are anode reset frames.

In other words, after one refresh frame is output, four anode reset frames may be continuously performed.

Accordingly, the display device 100 may change from the high-speed driving mode to the low-speed driving mode.

However, when the display device 100 is changed from the high-speed driving mode of the first driving frequency to the low-speed driving mode of the second driving frequency, an image quality defect such as flicker may occur due to a luminance deviation between the refresh frame of the high-speed driving mode and the anode reset frame of the low-speed driving mode.

Figure 7:
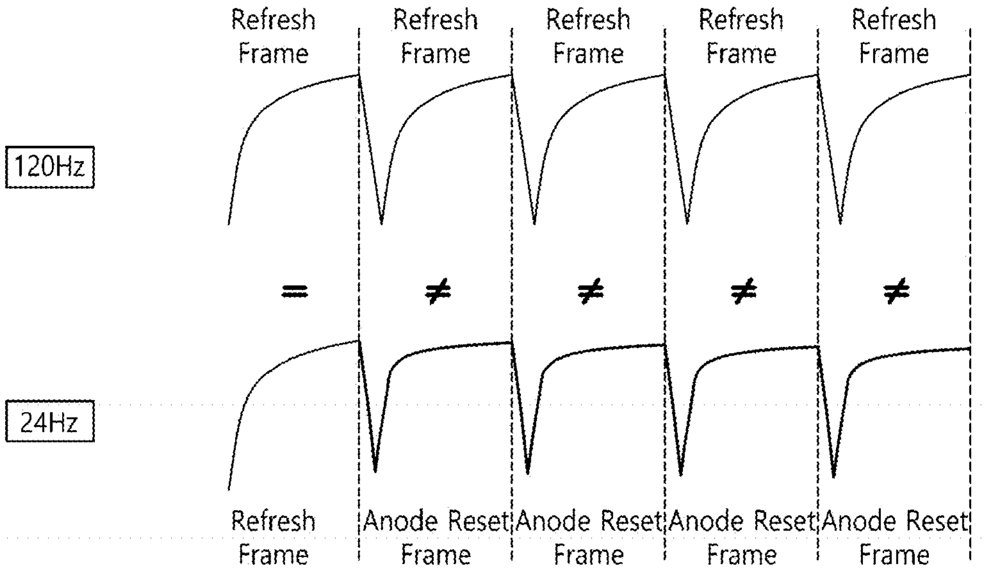
FIG. 7 is a view illustrating an example of a luminance graph when a display device in which a driving frequency is changed operates at high-speed driving and low-speed driving.

FIG. 7 is a view illustrating an example of a luminance graph when a display device in which a driving frequency is changed operates at high-speed driving and low-speed driving.

As shown in FIG. 7, when the display device 100 is driven in the normal driving mode of 120 Hz, 120 refresh frames may proceed in the display area for one second.

In this case, while the same image data is displayed in the refresh frame, the luminance of each refresh frame may be the same.

Meanwhile, when the display device 100 is driven in the low-speed driving mode of 24 Hz, 24 refresh frames and 96 anode reset frames proceed for one second.

In this case, after one refresh frame is output, four anode reset frames may continuously proceed.

Here, the luminance of the section in which the anode reset frame proceeds in the low-speed driving mode of 24 Hz may be different from the luminance of the section in which the refresh frame proceeds in the normal driving mode of 120 Hz.

In this case, when the display device 100 is changed from the normal driving mode of 120 Hz to the low-speed driving mode of 24 Hz, an image quality defect such as flicker may occur due to the luminance deviation between the refresh frame in the high-speed driving mode and the anode reset frame in the low-speed driving mode.

In the display device 100 in which the driving frequency is changed, the luminance deviation between the refresh frame in the high-speed driving mode and the anode reset frame in the low-speed driving mode may occur due to various factors.

First, when the display device 100 changes the driving frequency by counting the number of specific pulse signals input from the host system, a time delay may occur at the time when the driving frequency is changed and the time when the driving voltage is changed, and thus a luminance deviation may appear.

Figure 8:
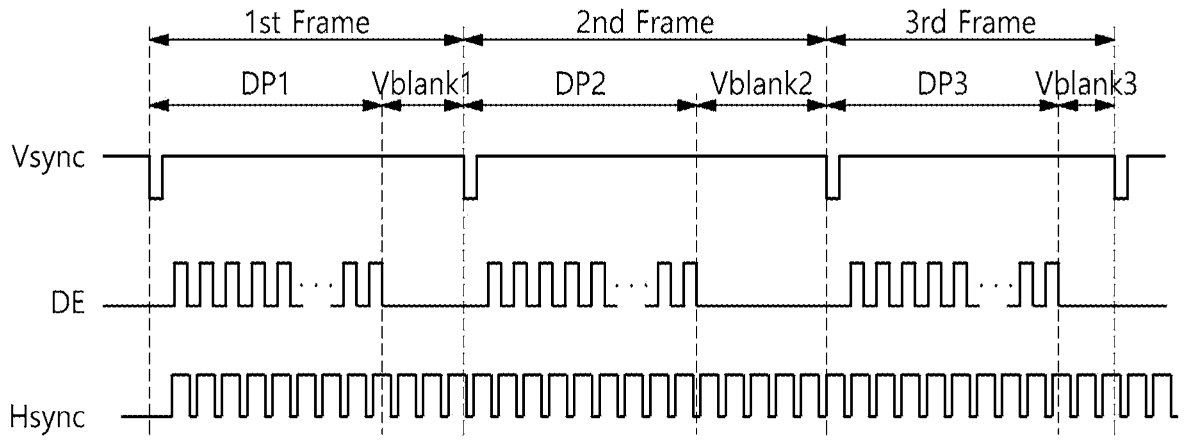
FIG. 8 is a view illustrating an example of a signal waveform in which a vertical blank section is changed according to a driving frequency in a display device.

FIG. 8 is a view illustrating an example of a signal waveform in which a vertical blank section is changed according to a driving frequency in a display device.

Here, the data vertical synchronization signal Vsync, the horizontal synchronization signal Hsync, and the enable signal DE supplied from the host system to the display device 100 are shown.

As shown in FIG. 8, one frame may indicate a time interval when an image is output once for the entire section of the display panel 110. Specifically, one frame includes display driving periods DP1, DP2, and DP3 during which an image is output and vertical blank sections Vblank1, Vblank2, and Vblank3 during which an image is not output. Further, a horizontal blank section may be included in the display driving periods DP1, DP2, and DP3, and the horizontal blank section may be determined by the horizontal synchronization signal Hsync.

That the image is not output in the vertical blank sections Vblank1, Vblank2, and Vblank3 may mean that the data enable signal DE maintains a low level, so that the data voltage Vdata for implementing an image in the vertical blank sections Vblank1, Vblank2, and Vblank3 is not transferred to the data line DL.

The first frame 1st Frame, the second frame 2nd Frame, and the third frame 3rd Frame refer to an order of one-frame periods. In other words, the second frame 2nd Frame starts after the first frame 1st Frame, and the third frame 3rd Frame starts after the second frame 2nd Frame. Each of the first frame 1st Frame to the third frame 3rd Frame lasts for the one-frame period.

Here, the respective one-frame periods of the first frame 1st Frame to the third frame 3rd Frame may be different from each other. In particular, in the first frame 1st Frame to the third frame 3rd Frame, the display driving periods DP1, DP2, and DP3 may be the same, but the vertical blank sections Vblank1, Vblank2, and Vblank3 may be set to differ.

In other words, the first display driving period DP1 of the first frame 1st Frame, the second display driving period DP2 of the second frame 2nd Frame, and the third display driving period DP3 of the third frame 3rd Frame are the same.

On the other hand, the first vertical blank section Vblank1 of the first frame 1st Frame, the second vertical blank section Vblank2 of the second frame 2nd Frame, and the third vertical blank section Vblank3 of the third frame 3rd Frame may be set to differ from each other.

For example, when the driving frequency is 120 Hz in the high-speed driving mode, the data voltage Vdata of one frame may be repeatedly supplied 120 times for one second, and the one frame may have a time interval of 8.3 ms.

In this case, when the display panel 110 has a resolution of 2,160×3,840, 2,160 gate lines GL may be arranged in the vertical direction, and thus the data enable signal DE including 2,160 pulses may be applied in the display driving period DP to correspond to the time when the 2,160 gate lines GL are turned on in the one frame.

Meanwhile, during the display driving periods DP1, DP2, and DP3, the data enable signal DE is applied in a pulse form, but during the vertical blank sections Vblank1, Vblank2, and Vblank3, the data enable signal DE maintains a low level.

The horizontal synchronization signal Hsync may be applied in a pulse form during the vertical blank sections Vblank1, Vblank2, and Vblank3 as well as the display driving periods DP1, DP2, and DP3. When the time interval of the vertical blank sections Vblank1, Vblank2, and Vblank3 is changed as the driving frequency is changed from the high-speed driving mode to the low-speed driving mode, the number of pulses of the horizontal synchronization signal Hsync included in one frame is also changed.

Accordingly, the timing controller 140 of the display device 100 may identify the driving frequency by detecting the number of pulses of the horizontal synchronization signal Hsync included in one frame or the low-level section of the data enable signal DE.

However, at the time when the timing controller 140 identifies the data enable signal DE or the horizontal synchronization signal Hsync and the driving frequency is determined to be changed, the anode reset frame section of the low-speed driving mode already proceeds, so that an image defect, such as flicker, occurs in the display panel 110 due to a mismatch in driving frequency and driving voltage.

Figure 9:
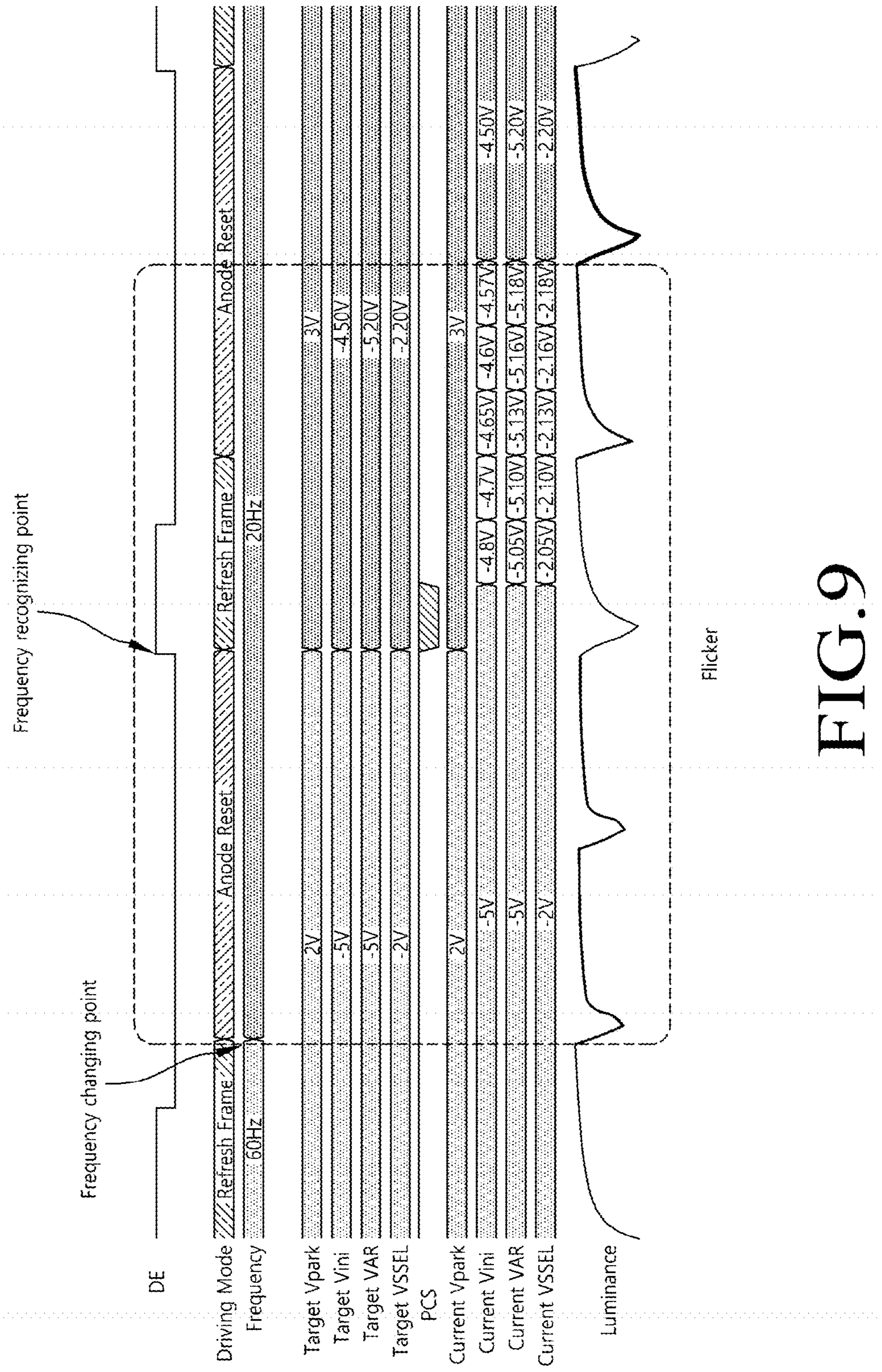
FIG. 9 is a signal waveform diagram illustrating an example of an image defect when a change in driving frequency is identified using a data enable signal in a display device.

FIG. 9 is a signal waveform diagram illustrating an example of an image defect when a change in driving frequency is identified using a data enable signal in a display device.

As shown in FIG. 9, the timing controller 140 of the display device 100 may determine a change in the driving frequency by detecting a change in the data enable signal DE.

In this case, it is necessary to detect a signal variation of the data enable signal DE for at least one frame from the time when the driving frequency of the input image data is changed.

The timing controller 140 generates the power control signal PCS to change the level of the driving voltage (e.g., the initialization voltage Vini, the reset voltage VAR, or the low-potential base voltage VSSEL) applied to the display panel 110 at the time of recognizing the change in the driving frequency, and transfers the target driving voltage to the power management circuit 150.

Accordingly, the time when the timing controller 140 recognizes the change in the driving frequency has a time delay of at least one frame from the time when the driving frequency of the actually input image data is changed.

As a result, an image defect such as flicker occurs when the driving frequency is changed.

Further, since the frame rates are different in the high-speed driving mode and the low-speed driving mode of the display device 100, it is necessary to set the driving voltage suitable for the frame rate according to the driving frequency. Accordingly, it is required to control the driving voltage corresponding to the driving frequency according to the time when the driving frequency of the display device 100 is changed. For example, as the driving frequency decreases, the driving voltage may increase.

The display device 100 according to the disclosure may determine the distance to the user and the non-use time of the user, and change the driving voltage or the data signal (data voltage/park voltage) at the time when the driving mode or the driving frequency is changed, thereby reducing image defects due to time delay.

To that end, the display device 100 according to the disclosure may include a module capable of counting the distance to the user and the non-use time of the user.

Figure 10:
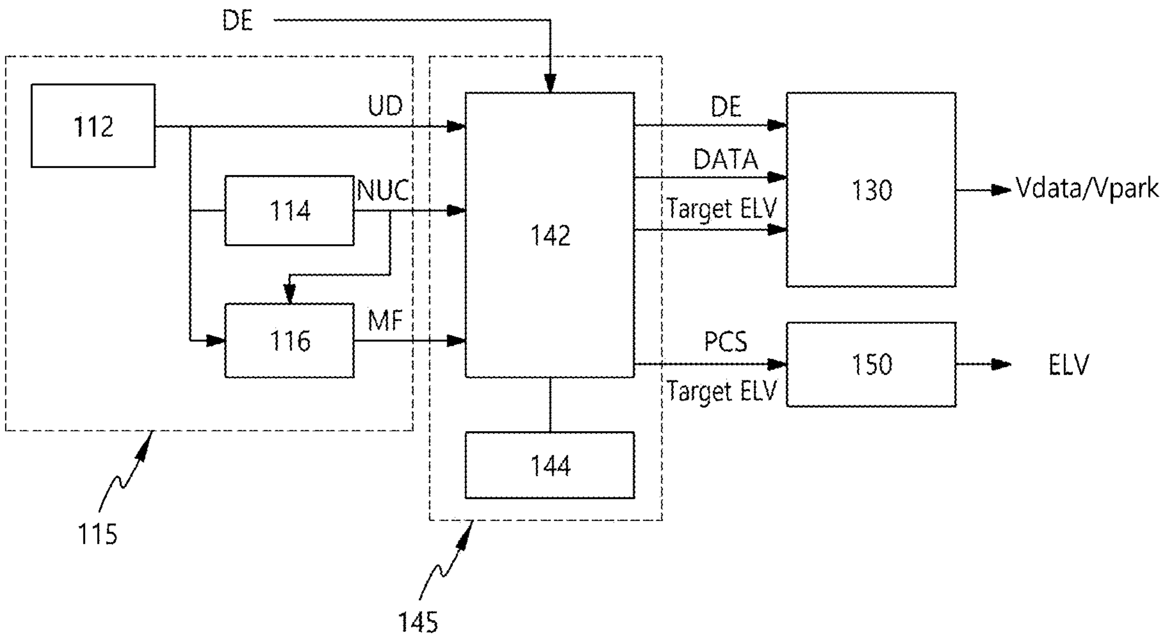
FIG. 10 is a block diagram illustrating changing a driving voltage or a data voltage according to a change in frequency in a display device according to embodiments of the disclosure.

FIG. 10 is a block diagram illustrating changing a driving voltage or a data voltage according to a change in frequency in a display device according to embodiments of the disclosure.

As shown in FIG. 10, a display device 100 according to embodiments of the disclosure may include a mode control circuit 115 for determining a state of a user, a compensation control circuit 145 for controlling compensation of a driving voltage or a data voltage according to the state of the user, a data driving circuit 130, and a power management circuit 150.

The data driving circuit 130 and the power management circuit 150 are the same in configuration as those of FIG. 2, and may supply the compensated data signal or the compensated driving voltage ELV to the display panel 110, respectively, under the control of the compensation control circuit 145.

Here, the compensated data signal corresponds to the voltage supplied to the display panel 110 through the data line in the second driving mode (e.g., 20 Hz driving frequency) changed according to the state of the user. The data signal may correspond to the data voltage Vdata during the refresh frame period and may correspond to the park voltage Vpark during the anode reset frame period.

The data signal applied in the second driving mode corresponding to the low-speed driving frequency based on the same image data may have a larger value than the data signal applied in the first driving mode (e.g., 120 Hz driving frequency) corresponding to the normal driving frequency.

The compensated driving voltage ELV corresponds to the driving voltage (e.g., the initialization voltage Vini, the reset voltage VAR, or the low-potential base voltage VSSEL) supplied to the display panel 110 in the second driving mode (e.g., the 20 Hz driving frequency) changed according to the state of the user.

The mode control circuit 115 may include a distance sensor 112 for measuring a distance (user distance UD) between the user and the display device 100, a non-use counter 114 for detecting a non-use time NUC of the display device 100, and a mode output circuit 116 for generating a mode flag MF indicating a driving mode (or driving frequency) according to the user distance UD and the non-use time NUC.

The distance sensor 112 may be, e.g., a camera disposed on the display panel 110 to detect an image of the user.

The non-use counter 114 may detect the non-use time NUC by generating an internal clock signal in the display device 100 and counting the internal clock signal from the time when the input signal is finally received from the input device (mouse or keyboard) until the next input signal is received.

The mode output circuit 116 may generate a mode flag MF for changing the driving mode (or driving frequency) of the display device 100 using data for the user distance UD and the non-use time NUC.

For example, the driving mode may include a display off mode in which, as the user is absent in front of the display device 100 for a predetermined time or more, no signal is output to the display panel 110, and the screen is turned off, or a low-speed driving mode in which, as the user is positioned in front of the display device 100, but does not use the display device 100 for a predetermined time or more, the signal supplied to the display panel 110 is supplied at a low-speed frequency. The low-speed driving mode may include a plurality of low-speed driving modes corresponding to two or more low-speed driving frequencies lower than a reference driving frequency (e.g., 120 Hz).

The compensation control circuit 145 may include a target level control circuit 142 for determining the level of the target driving voltage Target ELV according to the user distance UD and the non-use time NUC.

In this case, the target driving voltage Target ELV may be created as a lookup table to correspond to the user distance UD and the non-use time NUC and stored in the memory 144.

In this case, the target level control circuit 142 may extract the target driving voltage Target ELV corresponding to the user distance UD and the non-use time NUC transferred from the mode control circuit 115 from the memory 144 and transfer the same to the data driving circuit 130 or the power management circuit 150. In this case, when the target level control circuit 142 outputs the target driving voltage Target ELV, the target level control circuit 142 may output the power control signal PCS indicating the change in the driving voltage together.

The compensation control circuit 145 may be disposed inside the timing controller 140 or may be implemented as a separate integrated circuit outside the timing controller 140.

The data driving circuit 130 may supply a data signal corresponding to the target driving voltage Target ELV transferred from the compensation control circuit 145 to the display panel 110.

Further, the power management circuit 150 may supply the compensated driving voltage ELV to the display panel 110 according to the target driving voltage Target ELV transferred from the compensation control circuit 145. The compensated driving voltage ELV may be the same value as the target driving voltage Target ELV or may be a value modified considering a time delay.

Figure 11:
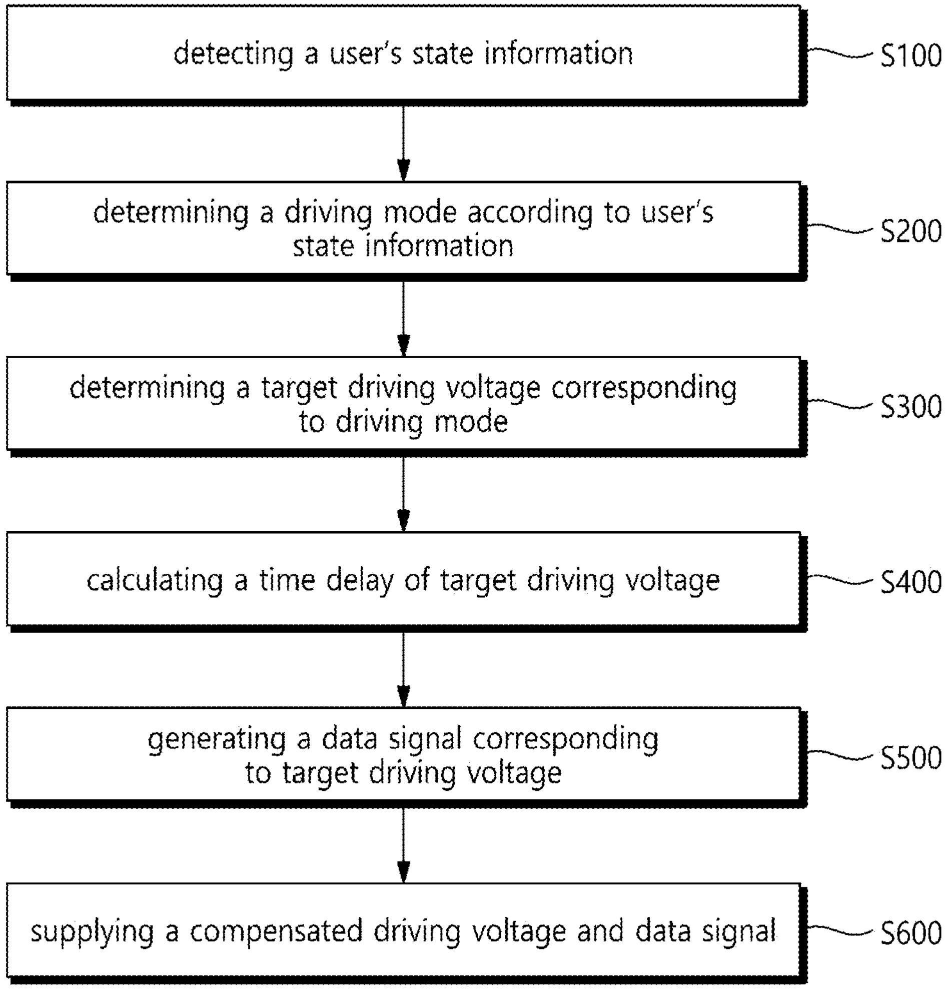
FIG. 11 is a flowchart illustrating a display driving method according to embodiments of the disclosure.

FIG. 11 is a flowchart illustrating a display driving method according to embodiments of the disclosure.

As shown in FIG. 11, a display driving method according to embodiments of the disclosure may include a step S100 of detecting a user's state information, a step S200 of determining a driving mode according to the user's state information, a step S300 of determining a target driving voltage Target ELV corresponding to the driving mode, a step S400 of calculating a time delay of the target driving voltage Target ELV, a step S500 of generating a data signal corresponding to the target driving voltage Target ELV, and a step S600 of supplying a compensated driving voltage ELV and the data signal.

The step S100 of detecting the user's state information is a process of detecting a user distance UD between the user and the display device 100 using a distance sensor and a non-use time NUC of the display device 100 using the internal clock signal.

The step S200 of determining the driving mode according to the user's state information is a process of changing the driving mode of the display device 100 using the user state information such as the user distance UD and the non-use time NUC.

For example, the driving mode may include a display off mode in which, as the user is absent for a predetermined time or more, no signal is output to the display panel 110, and the screen is turned off, or a low-speed driving mode in which, as the user is positioned in front of the display device 100, but does not use the display device 100 for a predetermined time or more, the signal supplied to the display panel 110 is supplied at a low-speed frequency. The low-speed driving mode may be divided into two or more low-speed driving modes corresponding to two or more low-speed driving frequencies.

In this case, the driving mode may be changed to the low-speed driving mode when the user distance UD and the non-use time NUC exceed a first reference distance and a first reference time. Further, when the user distance UD and the non-use time NUC exceed a second reference distance and a second reference time, it may be changed to the display-off mode.

The step S300 of determining the target driving voltage Target ELV corresponding to the driving mode is a process of determining the target driving voltage Target ELV corresponding to the low-speed driving mode changed according to the user's state information.

The target driving voltage Target ELV may be set to a level for compensating to change a luminance graph corresponding to the low-speed driving mode (e.g., a driving frequency of 20 Hz) to a luminance graph corresponding to a high-speed driving mode (e.g., 120 Hz).

Figure 12:
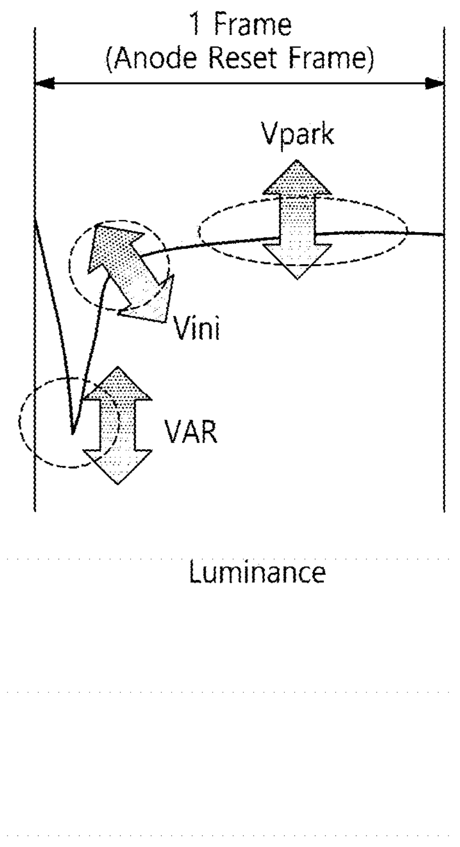
FIG. 12 is a view illustrating a variation in luminance graph according to a driving voltage during an anode reset frame period in a display driving method according to embodiments of the disclosure.

FIG. 12 is a view illustrating a variation in luminance graph according to a driving voltage during an anode reset frame period in a display driving method according to embodiments of the disclosure.

As shown in FIG. 12, in a display driving method according to embodiments of the disclosure, luminance during an anode reset frame period may vary according to levels of a reset voltage VAR, an initialization voltage Vini, and a park voltage Vpark.

The luminance decreases at the time when the anode reset frame of one frame starts, but the luminance increases after the anode electrode of the light emitting element ED is reset by the reset voltage VAR. In this case, the singularity where the luminance graph rises may rise or fall due to the level of the reset voltage VAR.

After the reset voltage VAR is applied, the initialization voltage Vini is applied to the source electrode of the driving transistor DRT, and after the driving transistor DRT is initialized, the luminance converging to the saturation level is maintained. In this case, the singularity where the rising luminance is changed to converge to the saturation level may be changed by the level of the initialization voltage Vini.

The luminance of emission by the display panel after the initialization voltage Vini is applied may increase or decrease according to the level of the park voltage Vpark.

Accordingly, by controlling the level of the driving voltage including the reset voltage VAR, the initialization voltage Vini, and the park voltage Vpark, the luminance graph appearing in the anode reset frame of the low-speed driving mode may be changed to be identical or similar to the luminance graph appearing in the anode reset frame of the high-speed driving mode.

As described above, when the luminance graph appearing in the anode reset frame of the low-speed driving mode and the luminance graph appearing in the anode reset frame of the high-speed driving mode are identical or similar to each other, the luminance deviation may be reduced even if the driving frequency is changed, thereby reducing image defects such as flicker.

The target driving voltage Target ELV for controlling the luminance graph appearing in the anode reset frame may be created as a lookup table and stored in the memory 144 according to the driving frequency in the low-speed driving mode or the low-speed driving mode.

Meanwhile, the power management circuit 150 supplies the driving voltage ELV compensated by reflecting the target driving voltage Target ELV to the display panel 110, and a time delay occurs until the compensated driving voltage ELV is transferred to the display panel 110. The time delay of the driving voltage may be determined by a resistance component and a capacitance component between the node to which the driving voltage is applied and the display panel 110.

Accordingly, in the process of changing the current driving voltage to the target driving voltage Target ELV, it is effective to generate the driving voltage ELV compensated step by step by reflecting the time delay of the driving voltage.

The step S400 of calculating the time delay of the target driving voltage Target ELV is a process of gradually changing the target driving voltage Target ELV considering a resistance component and a capacitance component between the node to which the driving voltage is applied and the display panel 110.

Figure 13:
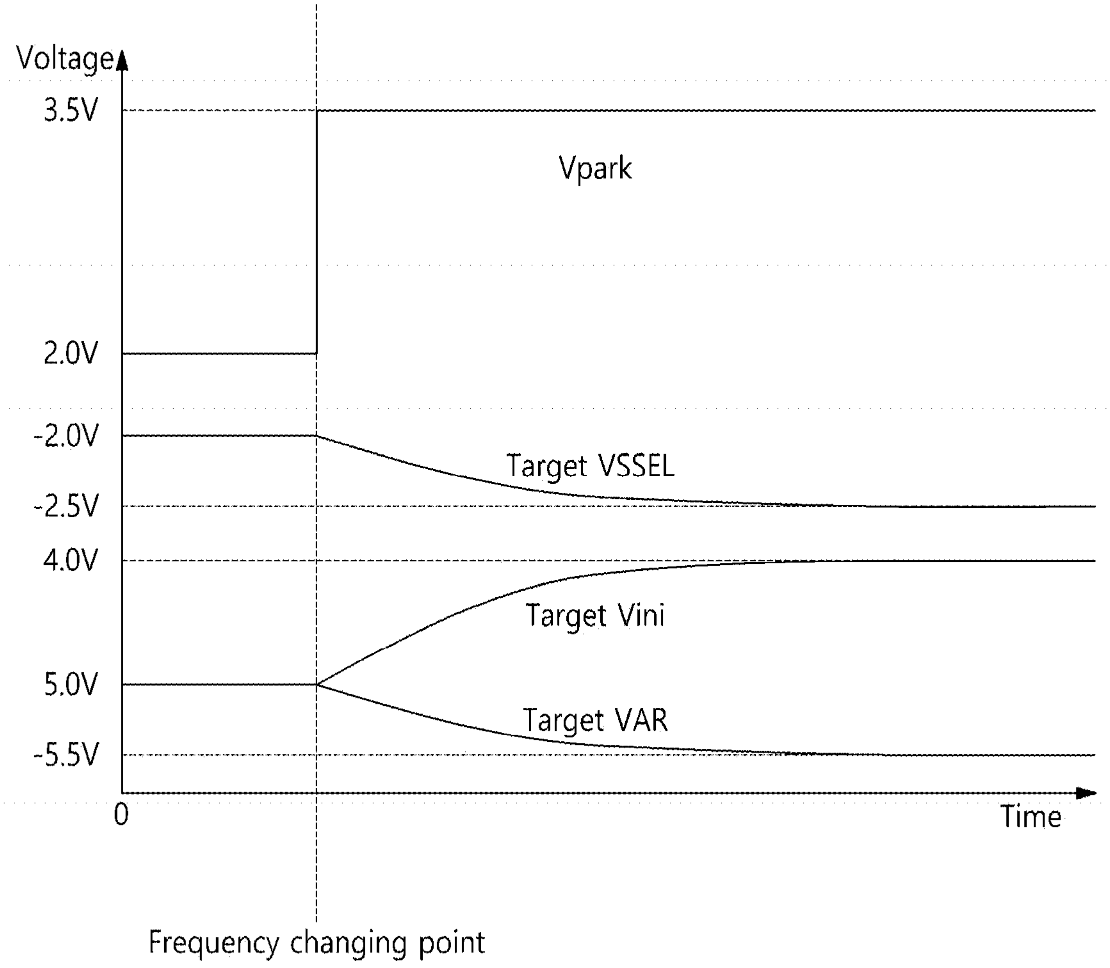
FIG. 13 is a graph illustrating an example of a data voltage and a target driving voltage which are changed according to a driving mode in a display driving method according to embodiments of the disclosure.
Figure 14:
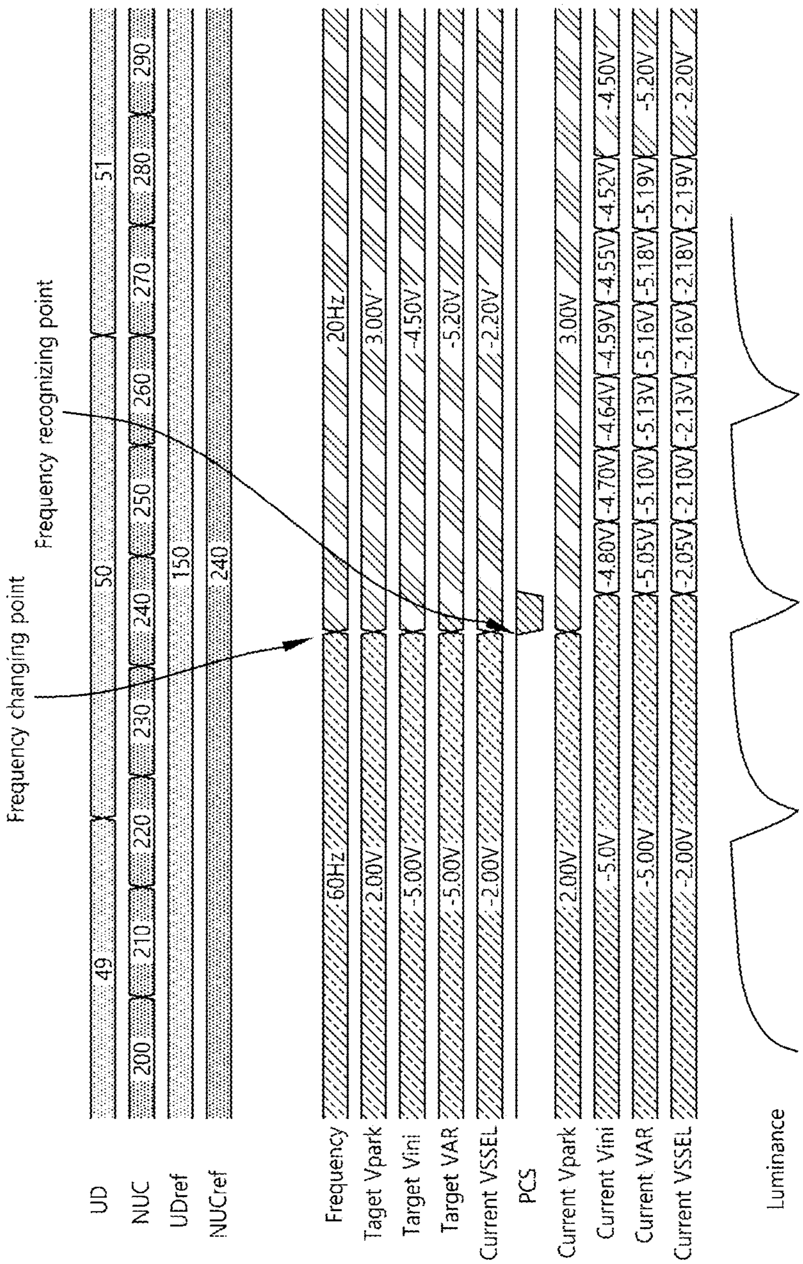
FIG. 14 is a signal waveform diagram illustrating an example process in which a driving voltage is sequentially changed according to a driving mode in a display driving method according to embodiments of the disclosure.

FIG. 13 is a graph illustrating an example of a data voltage and a target driving voltage which are changed according to a driving mode in a display driving method according to embodiments of the disclosure. FIG. 14 is a signal waveform diagram illustrating a process in which a driving voltage is sequentially changed according to a driving mode in a display driving method according to embodiments of the disclosure.

Here, it is exemplified that a high-speed driving mode operating at a driving frequency of 60 Hz is changed to a low-speed driving mode operating at a driving frequency of 20 Hz.

As shown in FIGS. 13 and 14, the display device 100 according to embodiments of the disclosure may generate a power control signal PCS at the time when the driving mode (driving frequency) is changed according to the user's state information (user distance and non-use time). Accordingly, in the display driving method according to the disclosure, since there is no time delay between the time when the driving mode (driving frequency) is changed and the time when the driving voltage is changed, a luminance deviation according to a change in the driving mode (driving frequency) may be reduced.

In this case, the target driving voltage Target ELV may be sequentially changed considering a resistance component and a capacitance component between the node to which the driving voltage is applied and the display panel 110.

For example, when the current park voltage Current Vpark in the driving mode in which the driving frequency is 60 Hz is 2.0V, and the target park voltage Target Vpark is changed to 3.5V at the time of being changed to the driving mode in which the driving frequency is 20 Hz, the park voltage Vpark may be instantly changed from 2.0V to 3.5V.

On the other hand, the driving voltage ELV including the initialization voltage Vini, the reset voltage VAR, and the low-potential base voltage VSSEL may gradually change from the current driving voltage Current ELV corresponding to the driving frequency of 60 Hz to the target driving voltage Target ELV corresponding to the driving frequency of 20 Hz. For example, the driving voltage ELV including the initialization voltage Vini, the reset voltage VAR, and the low-potential base voltage VSSEL may be gradually changed along the slope of the exponential function from the current driving voltage Current ELV to the target driving voltage Target ELV by reflecting the time delay.

As shown in FIG. 14, when the current initialization voltage Current Vini is −5.0V at the driving frequency of 60 Hz and the target initialization voltage Target Vini is −4.0V at the driving frequency of 20 Hz, the initialization voltage Vini may be changed to the graph of $-4.0-1.0\exp^{(-t/RC)}$. More specifically, the initialization voltage Vini may be gradually changed from −5.0V in the order of −4.8V, −4.7V, −4.64V, −4.59V, −4.55V, −4.52V, and −4.5V according to the graph of $-4.0-1.0\exp^{(-t/RC)}$. Here, RC represents the resistance component and the capacitance component between the node to which the initialization voltage Vini is applied and the display panel 110.

Further, when the current reset voltage Current VAR is −5.0V at the driving frequency of 60 Hz and the target reset voltage Target VAR is −5.5V at the driving frequency of 20 Hz, the reset voltage VAR may be changed to a graph of $-5.5-0.5\exp^{(-t/RC)}$. More specifically, the reset voltage VAR may be gradually changed from −5.0V in the order of −5.05V, −5.10V, −5.13V, −5.16V, −5.18V, −5.19V, and −5.20V according to the graph of $-5.5-0.5\exp^{(-t/RC)}$. Here, RC represents the resistance component and the capacitance component between the node to which the reset voltage VAR is applied and the display panel 110.

Further, when the current low-potential base voltage Current VSSEL is −2.0V at the driving frequency of 60 Hz and the target low-potential base voltage Target VSSEL is −2.5V at the driving frequency of 20 Hz, the low-potential base voltage VSSEL may be changed to a graph of −2.5-0.5exp$^{(-t/RC)}$. More specifically, the low-potential base voltage VSSEL may be gradually changed from −2.0V in the order of −2.05V, −2.10V, −2.13V, −2.16V, −2.18V, −2.19V, and −2.20V according to the graph of −2.5-0.5exp$^{(-t/RC)}$. Here, RC represents the resistance component and the capacitance component between the node to which the low-potential base voltage VSSEL is applied and the display panel 110.

As such, in a case where the first driving frequency is changed to the second driving frequency, if the driving voltage is gradually changed by reflecting the time delay in the process of changing the current driving voltage of the first driving frequency to the target driving voltage Target ELV of the second driving frequency, the luminance deviation due to time delay may be reduced.

The step S500 of generating the data signal corresponding to the target driving voltage Target ELV is a process of applying an offset to the data signal to reduce the luminance deviation by reflecting the change level of the driving voltage. The data signal of the anode reset frame period corresponds to the park voltage Vpark.

The offset of the park voltage Vpark may include a first offset reflecting a deviation of the gate-source voltage Vgs of the driving transistor DRT and a second offset reflecting a deviation according to a variation in the driving voltage.

For example, in the anode reset frame, the gate-source voltage Vgs of the driving transistor DRT may be expressed as the park voltage Vpark—the threshold voltage Vth—the initialization voltage Vini. In this case, due to the change in the driving mode (driving frequency), the gate-source voltage Vgs of the driving transistor DRT may be deviated in proportion to the variation amount of the initialization voltage Vini.

Accordingly, by applying the variation amount of the initialization voltage Vini as the first offset to the park voltage Vpark, the luminance deviation according to the variation of the gate-source voltage Vgs of the driving transistor DRT may be reduced.

Further, the second offset may be a deviation generated in the park voltage Vpark due to a change in the low-potential base voltage VSSEL and the reset voltage VAR.

Accordingly, by applying the variation amount of the low-potential base voltage VSSEL and the reset voltage VAR as the second offset to the park voltage Vpark, the luminance deviation due to the variation of the park voltage Vpark may be reduced.

Meanwhile, since the park voltage Vpark is a voltage supplied through the data line during the anode reset frame period, and the data voltage Vdata is a voltage supplied through the data line during the refresh frame period, when the luminance deviation in the refresh frame period is compensated, the compensated voltage supplied through the data line may be the data voltage Vdata.

The step S600 of supplying the compensated driving voltage ELV and the data signal is a process in which the power management circuit 150 supplies the driving voltage ELV corresponding to the target driving voltage Target ELV to the display panel 110, and the data driving circuit 130 supplies the data signal compensated by reflecting the target driving voltage Target ELV to the display panel 110.

As described above, it is possible to reduce image defects due to the luminance deviation by changing the driving voltage or data signal (data voltage/park voltage) to correspond to the driving mode or driving frequency at the time of changing the driving mode or driving frequency by determining the user distance UD and non-use time NUC.

Embodiments of the disclosure described above are briefly described below.

A display device according to the disclosure may comprise a display panel where a plurality of subpixels are disposed, a mode control circuit controlling a driving mode by determining a state of a user, a compensation control circuit controlling compensation for at least one of a driving voltage and a data signal according to the user's state, a data driving circuit supplying a compensated data signal to the display panel under control of the compensation control circuit, and a power management circuit supplying a compensated driving voltage to the display panel under control of the compensation control circuit.

The mode control circuit may include a distance sensor measuring a user distance from the display panel to the user, an non-use counter detecting a non-use time, and a mode output circuit generating a mode flag indicating a driving mode according to the user distance and the non-use time.

The non-use counter may detect the non-use time by counting an internal clock signal from a time when an input signal is finally received from an input device to a time when a next input signal is received.

The driving mode may include a normal driving mode of driving the display panel at a normal driving frequency, a display-off mode of turning off a screen of the display panel by determining that the user is absent, and a low-speed driving mode of determining that the user does not generate an input signal for a predetermined time or longer to supply the data signal at a low-speed driving frequency lower than the normal driving frequency.

The low-speed driving mode may include a plurality of low-speed driving modes one-to-one corresponding to a driving frequency.

The low-speed driving mode may include a refresh frame in which image data is output and an anode reset frame in which image data is not output.

In the refresh frame, a data voltage corresponding to the image data may be transferred through a data line, as the data signal and, in the anode reset frame, a park voltage for preventing a voltage variation of a driving transistor constituting the plurality of subpixels may be transferred through the data line, as the data signal.

Each of the plurality of subpixels may include a light emitting element having a cathode electrode to which a low-potential base voltage is applied, a driving transistor providing a driving current to the light emitting element, a first switching transistor having a gate electrode to which a first scan signal is applied, a drain electrode connected to a gate electrode of the driving transistor and a storage capacitor, and a source electrode connected to a source electrode of the driving transistor, a second switching transistor having a gate electrode to which a second scan signal is applied, a drain electrode to which a data voltage is applied, and a source electrode connected to a drain electrode of the driving transistor, a third switching transistor having a gate electrode to which a light emission signal is applied, a drain electrode to which a driving voltage is applied, and a source electrode connected to the drain electrode of the driving transistor, a fourth switching transistor having a gate electrode to which the light emission signal is applied, a drain electrode connected to the source electrode of the driving transistor, and a source electrode connected to the anode electrode of the light emitting element, a fifth switching transistor having a gate electrode to which a third scan signal is applied, a drain electrode to which an initialization voltage is supplied, and a source electrode connected to the source electrode of the driving transistor, and a sixth switching transistor having a gate electrode to which a fourth scan signal is applied, a drain electrode to which a reset voltage is supplied, and a source electrode connected to the anode electrode of the light emitting element.

The compensation control circuit may output a target driving voltage corresponding to a changed driving mode at a time when the driving mode is changed.

The target driving voltage may include a park voltage supplied through a data line in an anode reset frame in which the initialization voltage, the reset voltage, and image data are not output.

The target driving voltage may be gradually changed considering a resistance component and a capacitance component between a node to which a driving voltage is applied and the display panel.

The data signal may include a first offset reflecting a deviation of a gate-source voltage of a driving transistor constituting the plurality of subpixels or a second offset reflecting a deviation due to a variation in the driving voltage.

The first offset may reflect a variation amount of the initialization voltage.

The second offset may reflect a variation amount of the low-potential base voltage and the reset voltage.

A driving circuit according to the disclosure may comprise a mode control circuit determining a state of a user and controlling a driving mode, a compensation control circuit controlling compensation for a driving voltage or a data signal according to the user's state, a data driving circuit supplying a compensated data signal to a display panel under control of the compensation control circuit, and a power management circuit supplying a compensated driving voltage to the display panel under control of the compensation control circuit.

A display driving method according to the disclosure may comprise detecting a user's state information, determining a driving mode according to the user's state information, determining a target driving voltage corresponding to the driving mode, generating a data signal corresponding to the target driving voltage, and supplying a compensated driving voltage and the data signal.

The display driving method may further comprise calculating a time delay according to a resistance component and a capacitance component between a node to which a driving voltage is applied and a display panel.

The target driving voltage may be gradually changed according to the time delay.

The above description has been presented to enable any person skilled in the art to make and use the technical ideas of the disclosure, and has been provided in the context of example embodiments and applications. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide examples of the technical ideas of the disclosure for illustrative purposes only. That is, the disclosed embodiments are intended to illustrate the technical ideas of the disclosure by way of example. Thus, the scope of the present disclosure is not limited to the embodiments discussed herein.

What is claimed:

1. A display device, comprising:

a display panel including a plurality of subpixels;

a mode control circuit configured to control a driving mode by determining a state of a user;

a compensation control circuit configured to output a target driving voltage corresponding to a changed driving mode at a time when the driving mode is changed or configured to output a compensated data signal with a first offset reflecting a deviation of a gate-source voltage of a driving transistor constituting the plurality of subpixels according to the user's state;

a data driving circuit configured to supply the compensated data signal to the display panel according to control of the compensation control circuit; and a power management circuit configured to supply a compensated driving voltage to the display panel according to control of the compensation control circuit, wherein the compensated driving voltage is gradually changed based on a resistance component and a capacitance component between a node to which a driving voltage is applied and the display panel.

2. The display device of claim 1, wherein the mode control circuit includes:

a distance sensor configured to measure a user distance from the display panel to the user;

a non-use counter configured to detect a non-use time; and a mode output circuit configured to generate a mode flag indicating a driving mode according to the user distance and the non-use time.

3. The display device of claim 2, wherein the non-use counter is configured to detect the non-use time by counting an internal clock signal from a time when an input signal is finally received from an input device to a time when a next input signal is received.

4. The display device of claim 1, wherein the driving mode includes:

a normal driving mode of driving the display panel at a normal driving frequency;

a display-off mode of turning off a screen of the display panel by determining that the user is absent; and a low-speed driving mode of determining that the user does not generate an input signal for a predetermined time or longer to supply the data signal at a low-speed driving frequency lower than the normal driving frequency.

5. The display device of claim 4, wherein the low-speed driving mode includes a plurality of low-speed driving modes with a one-to-one correspondence to a driving frequency.

6. The display device of claim 4, wherein the low-speed driving mode includes a refresh frame in which image data is output and an anode reset frame in which image data is not output.

7. The display device of claim 6, wherein:

in the refresh frame, a data voltage corresponding to the image data is transferred through a data line as the data signal; and wherein in the anode reset frame, a park voltage for preventing a voltage variation of a driving transistor constituting the plurality of subpixels is transferred through the data line as the data signal.

8. The display device of claim 1, wherein each of the plurality of subpixels includes:

a light emitting element having a cathode electrode configured to receive a low-potential base voltage;

the driving transistor configured to provide a driving current to the light emitting element;

a first switching transistor having a gate electrode configured to receive a first scan signal, a drain electrode connected to a gate electrode of the driving transistor and a storage capacitor, and a source electrode connected to a source electrode of the driving transistor;

a second switching transistor having a gate electrode configured to receive a second scan signal, a drain electrode configured to receive a data voltage, and a source electrode connected to a drain electrode of the driving transistor;

a third switching transistor having a gate electrode configured to receive a light emission signal, a drain electrode configured to receive the driving voltage, and a source electrode connected to the drain electrode of the driving transistor;

a fourth switching transistor having a gate electrode configured to receive the light emission signal, a drain electrode connected to the source electrode of the driving transistor, and a source electrode connected to an anode electrode of the light emitting element;

a fifth switching transistor having a gate electrode configured to receive a third scan signal, a drain electrode configured to receive an initialization voltage, and a source electrode connected to the source electrode of the driving transistor; and a sixth switching transistor having a gate electrode configured to receive a fourth scan signal, a drain electrode configured to receive a reset voltage, and a source electrode connected to the anode electrode of the light emitting element.

9. The display device of claim 8, wherein the target driving voltage includes a park voltage supplied through a data line in an anode reset frame in which the initialization voltage, the reset voltage, and image data are not output.

10. The display device of claim 8, wherein the compensated data signal further includes:

a second offset reflecting a deviation due to a variation in the driving voltage.

11. The display device of claim 10, wherein the second offset reflects a variation amount of the low-potential base voltage and the reset voltage.

12. The display device of claim 8, wherein the first offset reflects a variation amount of the initialization voltage.

13. A display driving method, comprising:

detecting a user's state information based on at least one of a distance to the user and a non-input time for a display;

determining a driving mode according to the user's state information;

calculating a time delay according to a resistance component and a capacitance component between a node to which a driving voltage is applied and a display panel;

determining a target driving voltage corresponding to the driving mode;

generating a data signal corresponding to the target driving voltage; and supplying a compensated driving voltage and the data signal, wherein the compensated driving voltage is gradually changed according to the time delay.

14. A display driving method, comprising:

detecting a user's state information based on at least one of a distance to the user and a non-input time for a display;

determining a driving mode according to the user's state information;

determining a target driving voltage corresponding to the driving mode;

generating a data signal corresponding to the target driving voltage; and supplying a compensated driving voltage and the data signal, wherein the data signal includes:

a first offset reflecting a deviation of a gate-source voltage of a driving transistor constituting a plurality of subpixels, or a second offset reflecting a deviation due to a variation in a driving voltage.

* * * * *